June 11, 1935. M. A. LAABS 2,004,815
OPHTHALMIC LENS AND PROCESS OF MAKING THE SAME
Filed Aug. 10, 1932
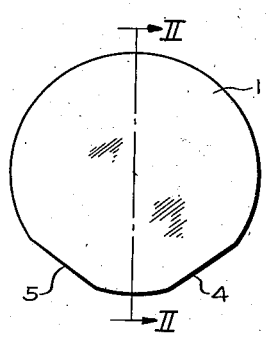
FIG. I
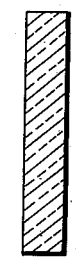
FIG. II
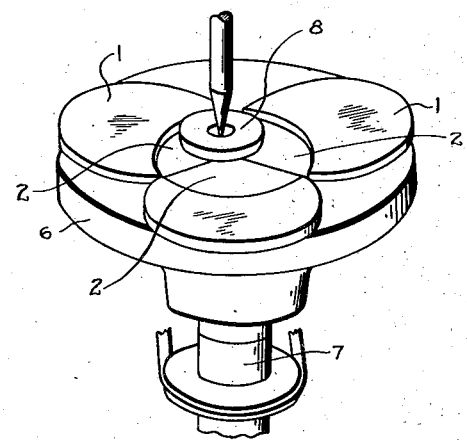
FIG. III
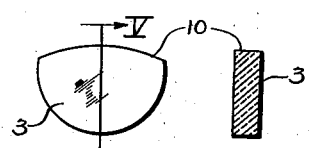
FIG. IV  FIG. V
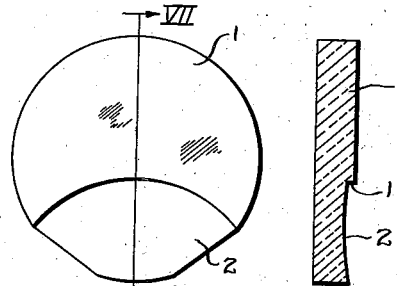
FIG. VI  FIG. VII
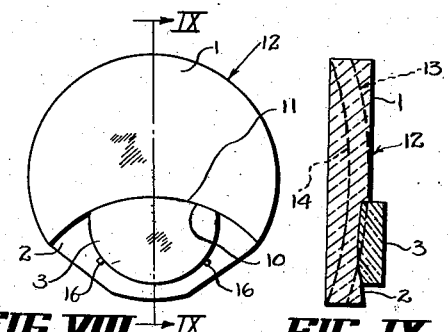
FIG. VIII
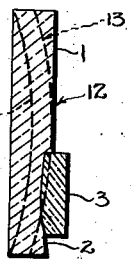
FIG. IX
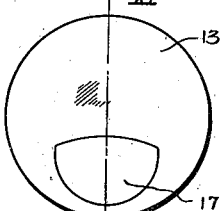
FIG. X
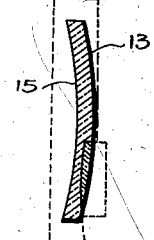
FIG. XI
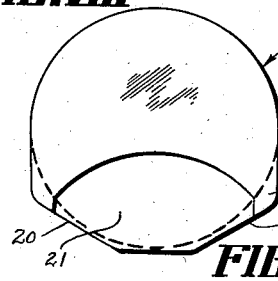
FIG. XII
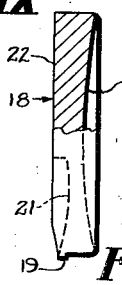
FIG. XIII
INVENTOR
Max A. Laabs.
BY Harry H. Styll
ATTORNEY Patented June 11, 1935

2,004,815

UNITED STATES PATENT OFFICE 2,004,815

OPHTHALMIC LENS AND PROCESS OF MAKING THE SAME

Max A. Laabs, Southbridge, Mass., assignor to American Optical Company, Southbridge, Mass., a voluntary association of Massachusetts Application August 10, 1932, Serial No. 628,191

8 Claims. (Cl. 88—54)

This invention relates to improvements in lenses and has particular reference to fused multifocal or bifocal lenses and lens blanks therefor and to an improved process of making the same.

One of the principal objects of the invention is to provide an improved process for making fused multifocal or bifocal lenses and blanks therefor in which the number of fusing operations has been reduced to a minimum.

Another object of the invention is to provide improved processes and means for making the recess for the reading portion of a fused multifocal or bifocal lens.

Another object of the invention is to provide an improved method of supporting a rough lens blank while forming the recess for the reading portion therein.

Another object of this invention is to provide a process for manufacturing fused multifocal or bifocal ophthalmic lenses in which the grinding and fusing steps necessary in forming the reading or near vision field are more easily performed and produce more perfect results than the processes previously employed.

Another object of this invention is to provide a process in which the number of surface forming steps necessary in making a fused multifocal or bifocal lens will be less than required in the prior art processes.

Another object is to provide a rough blank for a fused bifocal or multifocal lens which may be more easily, accurately and securely mounted for grinding the countersink therein to receive the reading segment.

Another object is to provide a countersink blank with a countersink of such form that a button to form the reading segment may be easily fused thereto.

Another object is to provide a fused unfinished blank which may be more easily and accurately produced than the devices of the prior art.

Another object is to provide an improved process of making a fused bifocal or multifocal lens in which the lower boundary of the reading field is substantially a true circle and in which the upper boundary is flattened so that the reading field is less than a true circle.

Other objects and advantages of the invention will become apparent from the following description taken in connection with the accompanying drawing and it will be apparent that many changes in the steps of the process and the arrangement and details of construction of the parts may be made without departing from the spirit of the invention as set forth in the accompanying claims. I, therefore do not wish to be limited to the exact arrangements shown and described, the preferred forms only having been shown by way of illustration.

In making the prior art fused multifocal or bifocal lenses with non-circular reading segments it was found necessary to first grind a circular depression in the major blank and then fuse a reading segment in said depression. This reading segment was formed of two pieces of glass fused together, one piece being of a high index of refraction adapted to form the reading segment and the other piece being of the same index of refraction as the major blank and of such size as necessary to complete the button so that it will fill the circular depression. To carry out this process two fusing operations were necessary; one, the fusing of the parts of the button together, and two, the fusing of the button into the countersink. This has made this type of lens costly to make and therefore expensive to the consumer.

Another process has also been devised to eliminate one of the fusing operations by grinding a depression in a curved surface of a rough blank to the exact shape of the reading segment desired and then fusing the reading segment in the depression. This process has been and is now being successfully used in the commercial art but it is believed that the present invention will cheapen the said process and increase production by increasing the latitude of operation beyond that necessitated in fitting the minor portion into a recess of its exact shape and proportions.

It is, therefore, one of the objects of the invention to provide an improved bifocal lens and blank therefor and to provide an improved process for making the same which will reduce the number of fusing and other operations to a minimum and thereby greatly reduce the cost of manufacture thereof.

Referring to the drawing:

Fig. I is a view of one face of a major blank, from which the lens is formed before the depression or countersink is ground out;

Fig. II is a sectional view taken on line II—II of Fig. I;

Fig. III is a perspective view of three simultaneously constructed lens blanks illustrating the method of grinding the depressions or countersinks;

Fig. IV is a view of one face of a minor disc or segment;

Fig. V is a sectional view taken on line V—V of Fig. IV;

Fig. VI is a view of the countersink side of a major blank with the depression ground out;

Fig. VII is a sectional view taken on line VII—VII of Fig. VI;

Fig. VIII is a view of the countersink side of the major blank of Fig. VI with the segment secured in the depression;

Fig. IX is a sectional view taken on line IX—IX of Fig. VIII;

Fig. X is a view of the bifocal or segment side of a finished lens made from the blank shown in Fig. VIII;

Fig. XI is a sectional view taken on line XI—XI of Fig. X and showing the outline of the fused blank before being finished.

Fig. XII is a view similar to Fig. VI, showing a modified type of major blank.

Fig. XIII is an edge view, partly in section, showing the blank of Fig. XII.

Referring more particularly to the drawing, in which similar reference characters designate corresponding parts throughout, there is shown a major blank 1 provided with the depression or countersink 2, in which the segment 3 is secured, preferably by fusion.

The depression or countersink 2 in the major blank 1 is formed preferably on several blanks at the same time, as shown in Fig. III. These major blanks 1 are comprised of flat pieces of crown glass of desired shape and thickness.

Two edge portions, 4 and 5, of each of the major blanks 1 have flattened portions or seats formed thereon so as to fit against the complementary seats of the other blanks which are to have their countersinks ground at the same time. The blanks 1 are then secured to a suitable supporting block 6, so that the edge seats 4 and 5 of each will fit closely against the edge seats of the adjacent blanks. The blanks are thus accurately positioned and firmly held with respect to each other. The block 6 is then rotated by the spindle 7 and the blanks 1 are abraded by the spherical grinding tool or lap 8 to form the spherical depressions or countersinks 2.

Because of the fact that the surfaces of the blanks are flat, the countersink 2 cut by the tool 8 will extend over the entire surface of each blank within the path of the tool. It has been found in practice that countersinks ground in flat blanks in this manner are more accurate as a rule than when they are ground in spherical blanks. When the flat blanks are used the tool grinds off about the same amount of glass at each position as it travels about its path, but when spherical blanks are used the grinding action is intermittent, the tool striking the high point on each sphere as it reaches it. As stated above, it has been found that the steady grinding action obtained with flat blanks produces a much better countersink surface, and hence, a better finished lens. The countersinks thus formed have a shouldered edge 11, as shown in Fig. VII, which gives the upper edge of the reading portion its shape as will be described. After being ground, these countersink surfaces are carefully polished to receive the reading segments.

The major portions 1 are then removed from the block 6 and the reading segments 3 of a higher index glass than the major portions are fused into the countersinks. The segments are formed with one edge 10 having a curvature substantially the same as the curvature of the shouldered edge 11 of the countersinks. The remaining outline of the segments may be whatever desired, but it is preferable that they be only slightly larger than the desired reading field in the finished lens. This is because the glass usually employed for these segments is rather expensive, and it is therefore desirable to use as little of it as possible. One face of each of these segments is then ground to substantially the curve of the countersink, and polished.

After the segments 3 have been prepared, they are placed in the countersinks 2 with their upper edges 10 in contact with the shouldered edges 11 of the countersinks and with their finished faces in contact with the ground and polished surfaces of the countersinks. A pair of chips or support members 16 are placed under the outer edge of each segment, as shown in Fig. VIII, to support it during fusion and to allow the air to escape from between the parts as the segment gradually becomes plastic and drops and fuses to the countersink surface. The major blanks are preferably tilted or inclined so that the segments will tend to slide toward the shouldered edge 11 of the countersinks and thus be maintained in proper position during fusing. The parts are then placed in a furnace and heated to fuse them together.

When the parts have been fused together, the fused blank 12 is removed from the furnace and allowed to cool after which the front surface is finished to the desired power by grinding the required curve 13 thereon.

It will be seen from Figs. X and XI that when the spherical front surface 13 is ground on the blank 12 all parts of the countersink 2, except that covered by the segment 3, may be ground away so as to produce a finished reading field 17 of the shape illustrated in Figs. X and XI. It will be readily seen that this reading field 17 will have a spherical addition power when so formed and will be of a shape which departs from a true circle.

Before selling the blank the manufacturer usually finishes the side 13 of the blank 12 on which the segment 3 is fused, thereby making it necessary for the dispenser to merely grind the desired prescription curve 15 on the other face of the blank. In order to assist the dispenser and keep him from having to grind off so much material, the manufacturer may grind the rear surface down to a surface such as 14, proximating the finished surface 15.

In Figures XII and XIII there is illustrated a modified form of major blank 18. This form is preferably moulded, and is formed with a projecting portion or flange, at the edge where the countersink is to be formed. As shown, the projecting portion 19 is formed with two flat edges 20 corresponding to and serving the same purpose as the flat edge seats 4 and 5 of the blank 1. The countersink 21 is ground in the same manner as the countersink 2 in the blank 1. The front surface 22 of the blank is formed flat so as to retain all the advantages of this invention, but the rear surface 23 may be moulded with a curve corresponding to the curve 14 ground on the rear surface of the blank 12, as above described. The remaining steps in forming a lens from the blank 18 are the same as described in connection with the blank 1.

From the above it will be seen that there has been provided an improved bifocal lens and blank therefor, and also simple, efficient, and economical means for making the same.

It will also be seen that by the present invention the step of fusing together two or more parts of a composite segment before fusing the segment into a countersink has been done away with. Also, because there is only one kind of glass in the button instead of two, it is much easier to fuse the button into the countersink.

It has also been found that it is much easier to fuse the segment into the countersink when the countersink is large because of having been formed on a flat blank, than when it is small, as when formed on a curved surface as in the prior art.

It will be readily appreciated that while I have described the rough blanks 1 as being separately formed and fitted together on the support 6, a single large blank might be mounted on the member 6 and cut apart into two or more countersink blanks after the countersink is ground.

It will be apparent that the lens may be formed with the countersink formed and the button fused into the concave or rear surface as well as the convex or front surface. In this instance the manufacturer would finish the rear surface instead of the front surface, leaving the front surface for the prescription curve.

It will also be apparent that there are many other modifications which might be made without departing from the spirit of the invention, and I therefore wish it to be distinctly understood that the scope of my invention is to be limited only by the prior art and by the terms of the appended claims.

Having described my invention, I claim:

1. A multifocal or bifocal lens comprising a major portion with a relatively large spherical segmental countersink portion therein with a shouldered edge between the major field and countersink portion, and a minor portion of different index of refraction secured in said countersink portion, said minor portion being relatively small with respect to the countersink portion and having bounding edges of two arcs of circles of different radius, one of said edges abutting the said shouldered edge and the other edge out of contact therewith, and the countersink portion extending beyond the nonabutting edge.

2. The process of making a multifocal or bifocal lens comprising forming a spherical segmental countersink portion in a major lens blank with a shouldered edge between the major field and the countersink portion, forming a minor portion of different index of refraction to fit in said countersink portion, said minor portion being relatively small as compared with the countersink portion, and securing said minor portion in said countersink portion with one portion of the edge of the minor portion abutting the shouldered edge of the countersink portion and with another portion of the edge not abutting the said shouldered edge and with a portion of the countersink portion extending beyond the edge portion of the minor portion not abutting said shouldered edge.

3. A multifocal or bifocal lens comprising a major portion of lens medium having a relatively large countersink therein with the shape of a portion of its contour edge definitely controlled and the remainder uncontrolled, and a minor portion of lens medium of a different index of refraction having a portion of its contour edge shaped substantially to the same contour shape and to align with the definitely shaped portion of the edge of the countersink secured in said countersink with the said shaped edges in aligned relation with each other, said countersink being relatively large with respect to the size of the minor portion and extending beyond said minor portion on all sides except the aligned said minor portion on all sides except the aligned shaped edges wherein portions of the shaped edge of the countersink extend outwardly beyond the opposite ends of the shaped edge of said minor portion.

4. A multifocal or bifocal lens comprising a major portion of lens medium having a relatively large countersink therein with the shape of a portion of its contour edge definitely controlled and shouldered between the major field and countersink portion, and a minor portion of lens medium of a different index of refraction having a portion of its contour edge shaped substantially to the same contour shape and to fit the shouldered edge secured in said countersink with the said edges in fitted relation with each other, said countersink portion being relatively large with respect to the size of the minor portion and extending beyond said minor portion on all sides except the fitted edges wherein portions of the shaped shouldered edge of the countersink extend outwardly beyond the opposite ends of the shaped edge of said minor portion.

5. The process of making a multifocal or bifocal lens comprising forming a relatively large countersink in a major piece of lens medium with the shape of a portion of its contour edge definitely controlled and the remainder uncontrolled, forming a minor portion of lens medium of a different index of refraction with a portion of its contour edge shaped substantially to the same shape and to fit the definitely shaped edge of the countersink and with the remainder of its contour uncontrolled, said minor portion being relatively small as compared with the countersink portion, placing the minor portion in the countersink with its shaped edge in fitted relation with the shaped edge of the countersink so that the remainder of the countersink portion extends beyond the minor portion on all sides except the fitted edges and so that portions of the shaped edge of the countersink will extend outwardly beyond the opposite ends of the shaped edge of said minor portion, and securing the minor portion in the countersink in said relation.

6. The process of making a multifocal or bifocal lens comprising forming a relatively large countersink in a major piece of lens medium with the shape of a portion of its contour edge definitely controlled and shaped to a cliff type edge and the remainder uncontrolled, forming a minor portion of lens medium of a different index of refraction with a portion of its contour edge shaped substantially to the same shape and to fit the cliff type edge of the countersink and with the remainder of its contour uncontrolled, said minor portion being relatively small as compared with the countersink portion, placing the minor portion in the countersink with its shaped edge in fitted relation with the cliff type edge so that portions of said cliff type edge extend outwardly beyond the opposite ends of the shaped edge of the minor portion and with the remainder of the countersink portion extending beyond the minor portion on all sides except the fitted edges, and securing the said minor portion in the countersink in said relation.

7. The process of making a multifocal or bifocal lens comprising forming a relatively large countersink in a major piece of lens medium with the shape of a portion of its contour edge definitely controlled and the remainder uncontrolled, forming a minor portion of lens medium of different index of refraction with a portion of its contour edge shaped substantially to the same shape and to fit the definitely shaped edge of the countersink and with the remainder of its contour uncontrolled, said minor portion being relatively small as compared with the countersink portion, placing the minor portion in the countersink with its shaped edge in fitted relation with the shaped edge of the countersink so that the remainder of the countersink portion extends beyond the minor portion on all sides except the fitted edges and so that portions of the shaped edge of the countersink will extend outwardly beyond the opposite ends of the shaped edge of said minor portion, securing the minor portion in the countersink in said relation and surfacing the side of the composite blank having the minor portion thereon until the contour of the minor portion and the contour of the countersink portion are reduced to substantially the same size and shape without changing the outline of the definitely shaped portions of the edges of said countersink and minor portion.

8. The process of making a multifocal or bifocal lens comprising forming a relatively large countersink in a major piece of lens medium with the shape of a portion of its contour edge definitely controlled and shaped to a cliff type edge and the remainder uncontrolled, forming a minor portion of lens medium of a different index of refraction with a portion of its contour edge shaped substantially to the same shape and to fit the cliff type edge of the countersink and with the remainder of its contour uncontrolled, said minor portion being relatively small as compared with the countersink portion, placing the minor portion in the countersink with its shaped edge in fitted relation with the cliff type edge of the countersink so that portions of said cliff type edge extend outwardly beyond the opposite ends of the shaped edge of the minor portion and with the remainder of the countersink portion extending beyond the minor portion, on all sides except the fitted edges, securing the minor portion in the countersink in said relation and surfacing the side of the composite blank having the minor portion thereon until the contour of the minor portion and the contour of the countersink portion are reduced to substantially the same size and shape without changing the outline of the definitely shaped edges of said countersink and minor portion.

MAX A. LAABS.